(12) United States Patent
Kato et al.

(10) Patent No.: US 11,199,663 B2
(45) Date of Patent: Dec. 14, 2021

(54) OPTICAL MULTIPLEXER/DEMULTIPLEXER AND METHOD FOR MANUFACTURING THE SAME

(71) Applicant: Mitsubishi Electric Corporation, Tokyo (JP)

(72) Inventors: Toshiharu Kato, Tokyo (JP); Shinichi Takagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/770,363

(22) PCT Filed: Apr. 5, 2018

(86) PCT No.: PCT/JP2018/014595
§ 371 (c)(1),
(2) Date: Jun. 5, 2020

(87) PCT Pub. No.: WO2019/193710
PCT Pub. Date: Oct. 10, 2019

(65) Prior Publication Data
US 2021/0173148 A1    Jun. 10, 2021

(51) Int. Cl.
*G02B 6/293* (2006.01)
*G02B 27/10* (2006.01)
*G02B 5/26* (2006.01)

(52) U.S. Cl.
CPC ..... *G02B 6/29367* (2013.01); *G02B 27/1006* (2013.01); *G02B 5/26* (2013.01); *G02B 6/29301* (2013.01)

(58) Field of Classification Search
None
See application file for complete search history.

(56) References Cited

U.S. PATENT DOCUMENTS 10,852,482 B1 *  12/2020  Gui ............... G02B 6/29367
2003/0152113 A1 *  8/2003  Kropp ............... G02B 6/4249
                                                                370/535

(Continued)

FOREIGN PATENT DOCUMENTS

| JP | 2014095843 A | 5/2014 |
| JP | 2016130813 A | 7/2016 |
| WO | 2018008154 A1 | 1/2018 |

OTHER PUBLICATIONS

International Search Report; Written Opinion; and Notification of Transmittal of the International Search Report and the Written Opinion of the International Searching Authority, or the Declaration issued in PCT/JP2018/014595; dated Jun. 26, 2018.

*Primary Examiner* — Jerry Rahll
(74) *Attorney, Agent, or Firm* — Studebaker & Brackett PC (57) ABSTRACT

A plurality of bandpass filters (2) are arranged side by side in a row on a fixed surface (1a) of a glass block (1) and fixed using an adhesive (3). Each bandpass filter (2) includes a coating film (6) for transmitting or reflecting light depending on a wavelength. Each bandpass filter (2) includes a first surface (2a) fixed to the fixed surface (1a), and a second surface (2b) opposite to the first surface (2a) and having a width larger than that of the first surface (2a). Opposing side surfaces of the adjacent bandpass filters (2) include a first portion (2c) on the first surface (2a) side and a second portion (2d) on the second surface (2b) side. A spacing between the first portions (2c) of the adjacent bandpass filters (2) is wider than a spacing between the second portions (2d) of the adjacent bandpass filters (2).

11 Claims, 8 Drawing Sheets

(56) References Cited

U.S. PATENT DOCUMENTS

| | | | |
|---|---|---|---|
| 2005/0152640 A1* | 7/2005 | Lemoff | G02B 6/2938 385/24 |
| 2012/0189314 A1* | 7/2012 | Xu | G02B 6/4215 398/135 |
| 2014/0133862 A1 | 5/2014 | Fujimura et al. | |
| 2017/0184789 A1* | 6/2017 | Xiao | H04J 14/02 |
| 2017/0329087 A1* | 11/2017 | Huh | G02B 6/29367 |
| 2018/0031768 A1* | 2/2018 | Miyata | G02B 6/2938 |
| 2018/0212708 A1* | 7/2018 | Tian | H04J 14/02 |
| 2019/0007154 A1* | 1/2019 | Nakayama | G02B 6/4261 |
| 2020/0159034 A1* | 5/2020 | Du | H04J 14/02 |

* cited by examiner

OPTICAL MULTIPLEXER/DEMULTIPLEXER AND METHOD FOR MANUFACTURING THE SAME

FIELD

The present invention relates to an optical multiplexer/demultiplexer that multiplexes or demultiplexes a plurality of signal light beams having different wavelengths and a method for manufacturing the optical multiplexer/demultiplexer.

BACKGROUND

Optical modules cause signal light that has passed through an optical multiplexer/demultiplexer to enter a receptacle or a light-receiving device via a condensing lens. In the optical multiplexer/demultiplexer, a plurality of bandpass filters are arranged side by side in a row and bonded to a glass block using an adhesive (e.g., see PTL 1).

CITATION LIST

Patent Literature

[PTL 1] JP 2014-95843 A

SUMMARY

Technical Problem

The adhesive creeps up among the plurality of bandpass filters caused by a capillary phenomenon. Contraction or expansion of the adhesive causes mounting angles of the bandpass filters to be shifted. Therefore, angles of signal light beams emitted from the respective bandpass filters are shifted. Thus, an optical module mounted with an optical multiplexer/demultiplexer has a problem that alignment cannot be achieved and assembly yield deteriorates.

The present invention has been implemented to solve the above-described problem and it is an object of the present invention to provide an optical multiplexer/demultiplexer capable of preventing mounting angles of a plurality of bandpass filters from being shifted, and a method for manufacturing the optical multiplexer/demultiplexer.

Solution to Problem

An optical multiplexer/demultiplexer according to the present disclosure includes: a glass block; and a plurality of bandpass filters arranged side by side in a row on a fixed surface of the block and fixed using an adhesive, wherein each bandpass filter includes a coating film for transmitting or reflecting light depending on a wavelength, each bandpass filter includes a first surface fixed to the fixed surface, and a second surface opposite to the first surface and having a width larger than that of the first surface, opposing side surfaces of the adjacent bandpass filters include a first portion on the first surface side and a second portion on the second surface side, and a spacing between the first portions of the adjacent bandpass filters is wider than a spacing between the second portions of the adjacent bandpass filters.

Advantageous Effects of Invention

In the present disclosure, the opposing side surfaces of the adjacent bandpass filters are widely opened on the first surface side fixed to the fixed surface of the block with the adhesive. Therefore, the adhesive does not creep up between the bandpass filters, thus making it possible to prevent the mounting angles of the plurality of bandpass filters from being shifted.

DESCRIPTION OF EMBODIMENTS

An optical multiplexer/demultiplexer and a method for manufacturing the same according to the embodiments of the present disclosure will be described with reference to the drawings. The same components will be denoted by the same symbols, and the repeated description thereof may be omitted.

First Embodiment

Figure 1:
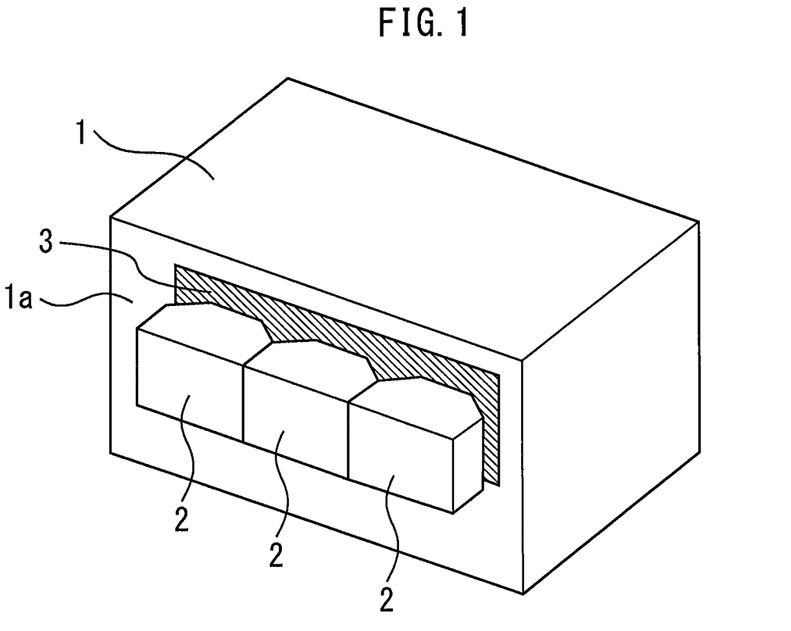
FIG. 1 is a perspective view illustrating an optical multiplexer/demultiplexer according to a first embodiment.
Figure 2:
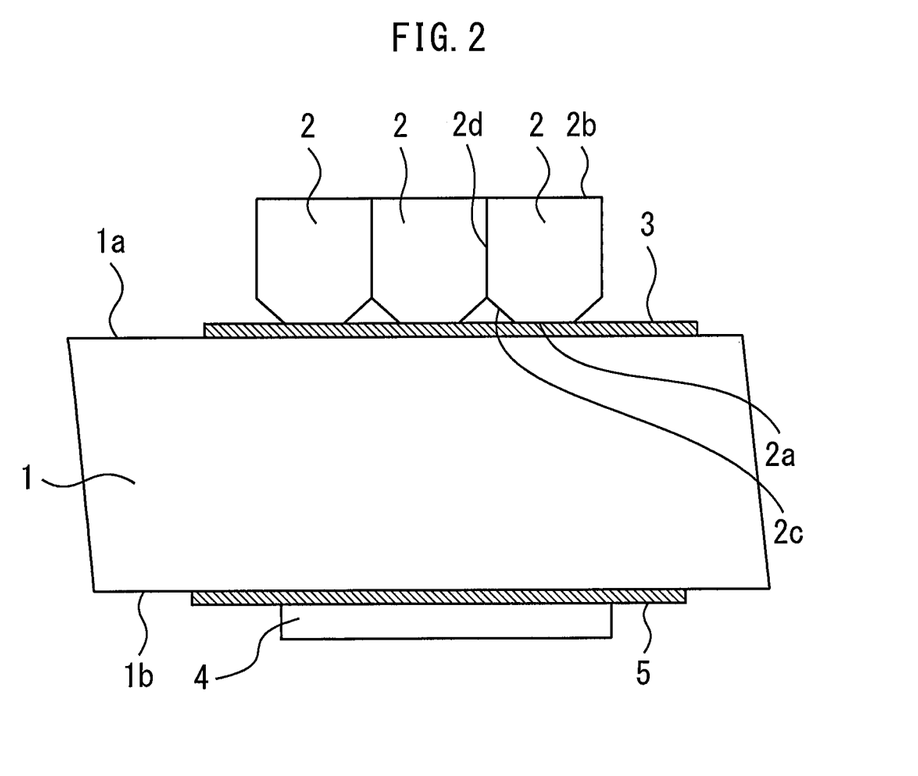
FIG. 2 is a cross-sectional view illustrating the optical multiplexer/demultiplexer according to the first embodiment.
Figure 3:
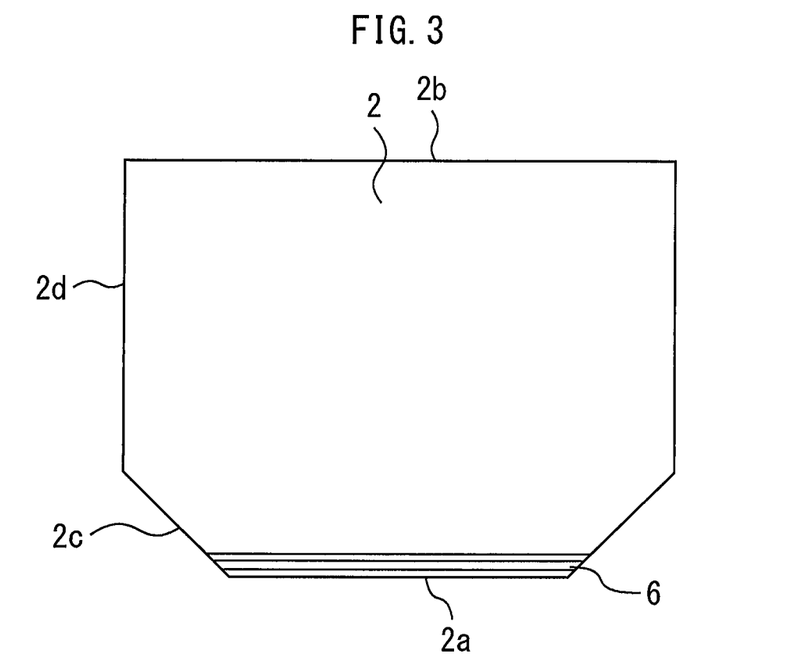
FIG. 3 is a cross-sectional view illustrating a bandpass filter.

FIG. 1 is a perspective view illustrating an optical multiplexer/demultiplexer according to a first embodiment. FIG. 2 is a cross-sectional view illustrating the optical multiplexer/demultiplexer according to the first embodiment. FIG. 3 is a cross-sectional view illustrating a bandpass filter. A plurality of glass bandpass filters 2 are arranged side by side in a row on a fixed surface 1a of a glass block 1 and fixed using an adhesive 3. A glass mirror 4 subjected to reflection coating is fixed to a surface 1b opposite to the fixed surface 1a of the block 1 using an adhesive 5.

A first surface 2a of the bandpass filter 2 is fixed to the fixed surface 1a and a second surface 2b opposite to the first surface 2a has a width larger than that of the first surface 2a.

A coating film 6 for transmitting or reflecting light depending on the wavelength is provided on the first surface 2a of each bandpass filter 2. The coating film 6 is a dielectric multilayer film in which 100 or more layers of dielectric film having a thickness of sub-micron order are stacked one on another. Note that the thickness of the bandpass filter 2 is on the order of 1 mm.

Opposing side surfaces of the adjacent bandpass filters 2 include a first portion 2c on the first surface 2a side and a second portion 2d on the second surface 2b side. A spacing between the first portions 2c of the adjacent bandpass filters 2 is wider than a spacing between the second portions 2d.

Figure 4:
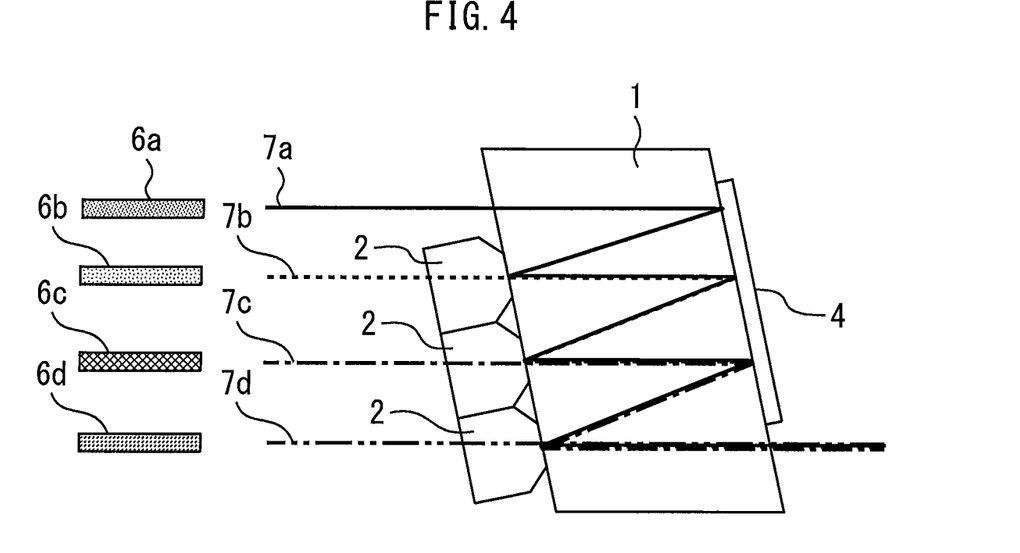
FIG. 4 is a cross-sectional view illustrating multiplexing of light beams by the optical multiplexer/demultiplexer according to the first embodiment.

FIG. 4 is a cross-sectional view illustrating multiplexing of light beams by the optical multiplexer/demultiplexer according to the first embodiment. Signal light beams 7a, 7b, 7c and 7d having different wavelengths emitted from lasers 6a, 6b, 6c and 6d are made incident on the block 1 and the bandpass filters 2, reflected by the mirror 4 and the coating film 6, and multiplexed.

Figure 5:
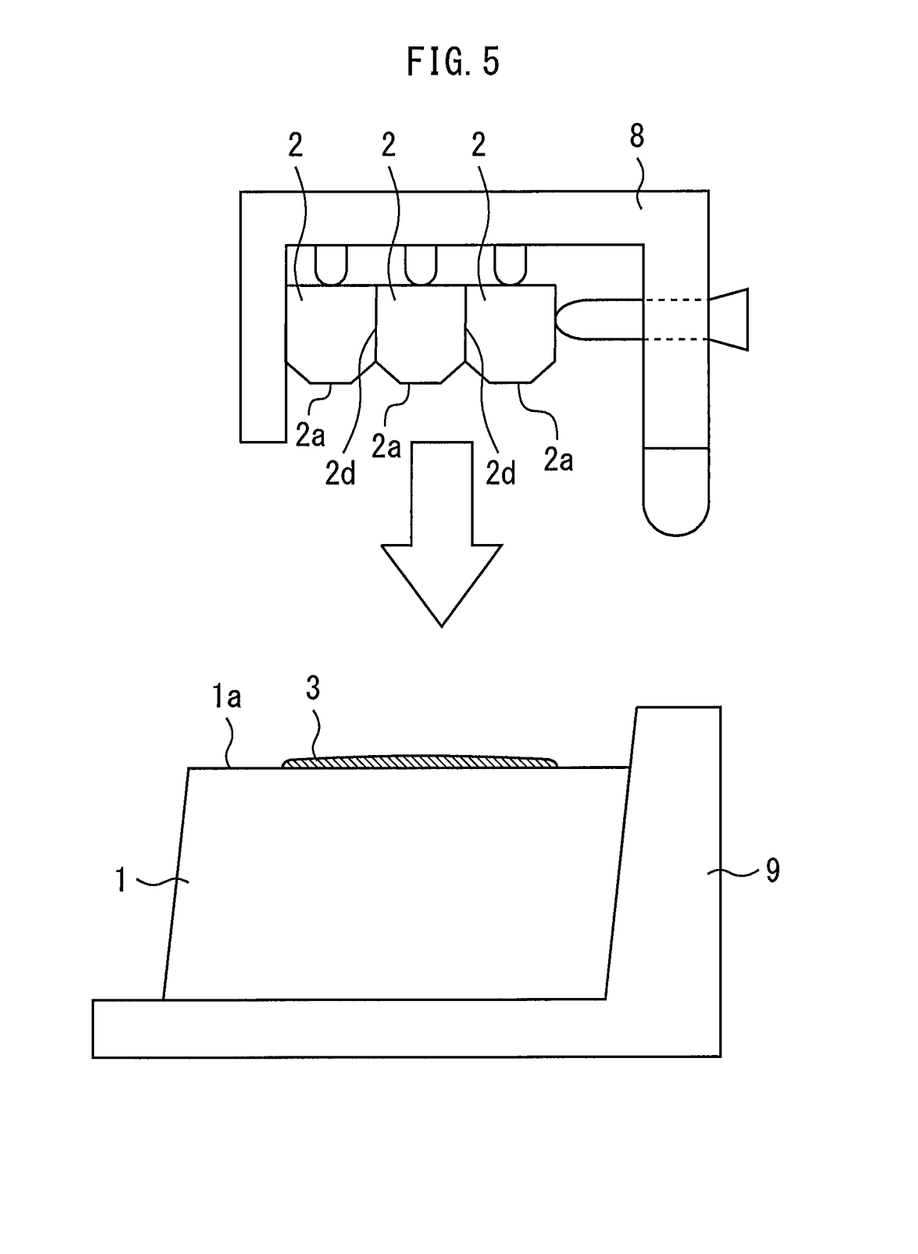
FIG. 5 is a cross-sectional view illustrating a method for manufacturing an optical multiplexer/demultiplexer according to the first embodiment.

FIG. 5 is a cross-sectional view illustrating a method for manufacturing an optical multiplexer/demultiplexer according to the first embodiment. First, the plurality of bandpass filters 2 are arranged side by side in a row, pressed and held to a first jig 8 with the first surface 2a facing downward such that the second portions 2d of the adjacent bandpass filters 2 come into contact with each other. Next, the block 1 in which the adhesive 3 is applied to the fixed surface 1a is held to a second jig 9. Next, the first jig 8 and the second jig 9 are combined, and the adhesive 3 is cured with the first surfaces 2a of the plurality of bandpass filters 2 in contact with the adhesive 3 applied to the block 1. After that, the holding of the first jig 8 and the second jig 9 is released. Pressing and holding the bandpass filters 2 together improves assemblability.

Figure 6:
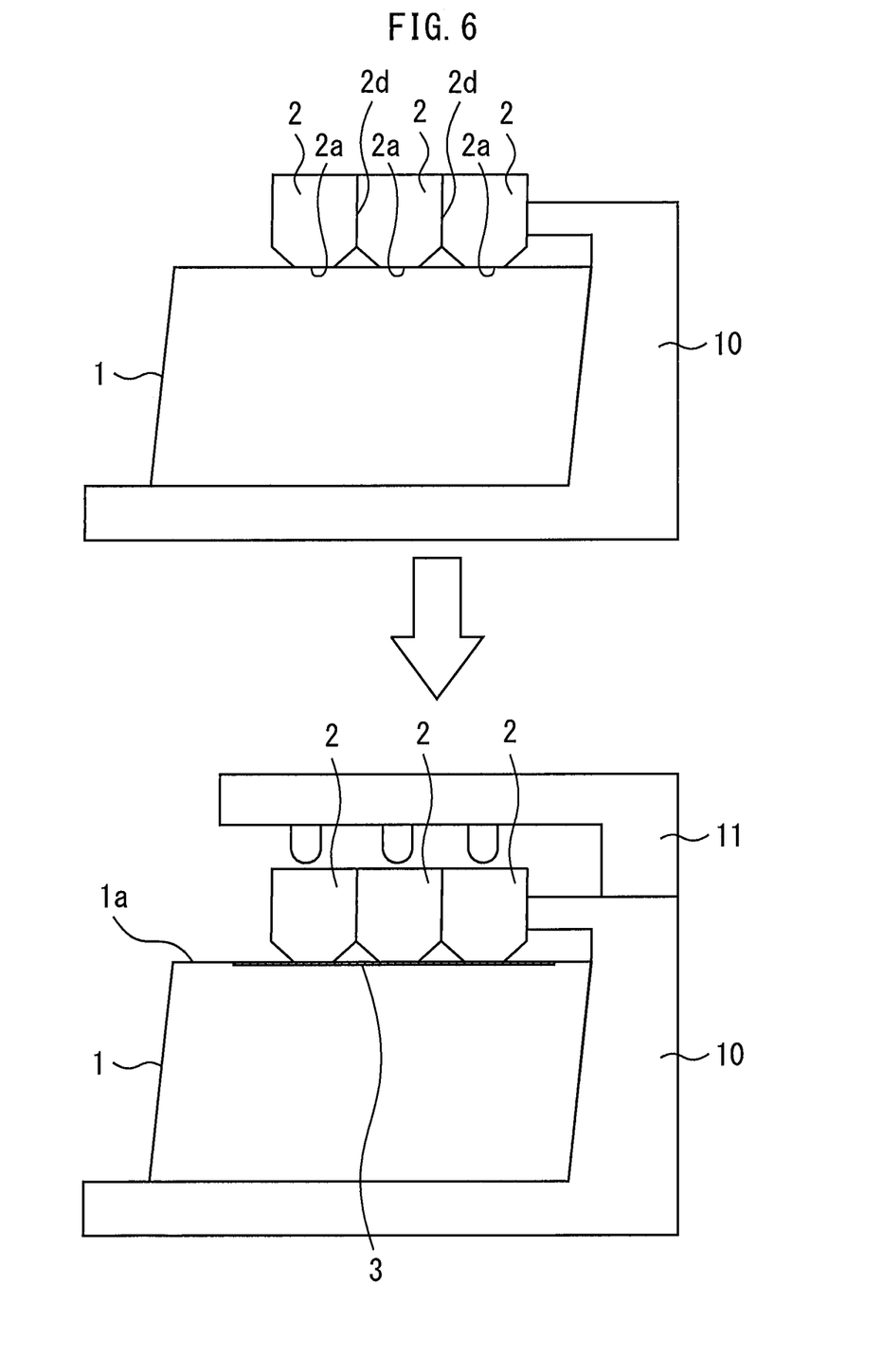
FIG. 6 is a cross-sectional view illustrating a modification of the method for manufacturing an optical multiplexer/demultiplexer according to the first embodiment.

FIG. 6 is a cross-sectional view illustrating a modification of the method for manufacturing an optical multiplexer/demultiplexer according to the first embodiment. First, the plurality of bandpass filters 2 are arranged side by side in a row and placed on the block 1 with the first surface 2a facing downward. The bandpass filters 2 are pressed to a first jig 10 such that the second portions 2d of the adjacent bandpass filters 2 come into contact with each other. Next, with the plurality of bandpass filters 2 pressed against the block 1 using a second jig 11, the adhesive 3 is applied to a gap between the fixed surface 1a of the block 1 and the first surfaces 2a of the plurality of bandpass filters 2. Next, the adhesive 3 is cured. After that, holding of the first jig 10 and the second jig 11 is released. Pressing and holding the bandpass filters 2 together improves assemblability in this case, too.

Figure 7:
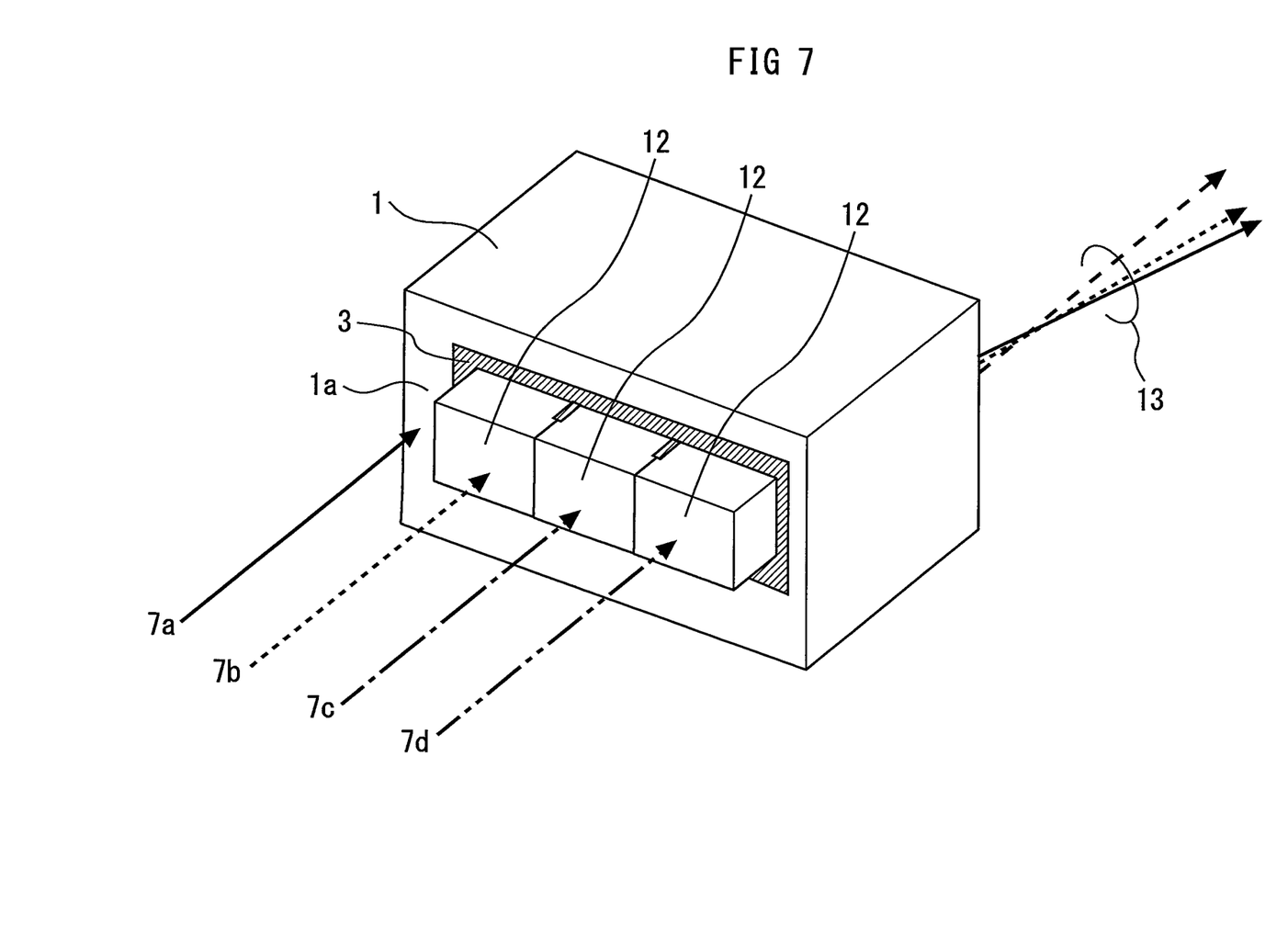
FIG. 7 is a perspective view illustrating an optical multiplexer/demultiplexer according to a comparative example.

Next, effects of the present embodiment will be described in comparison with a comparative example. FIG. 7 is a perspective view illustrating an optical multiplexer/demultiplexer according to a comparative example. Rectangular bandpass filters 12 are used in the comparative example. Thus, tiny gaps are produced between the bandpass filters 2 where the adhesive 3 creeps up by a capillary phenomenon. Contraction or expansion of the adhesive 3 causes the mounting angles of the bandpass filters 2 to be shifted. This causes angle shifts of the multiplexed light 13 of the signal light beams 7a, 7b, 7c and 7d made incident on the block 1 and bandpass filters 2.

By contrast, in the present embodiment, the opposing side surfaces of the adjacent bandpass filters 2 are widely opened on the first surface 2a side fixed to the fixed surface 1a of the block 1 with the adhesive 3. Therefore, the adhesive 3 does not creep up between the bandpass filters 2, thus making it possible to prevent the mounting angles of the plurality of bandpass filters 2 from being shifted. Angle shifts of the multiplexed light does not occur. Moreover, since the first portion 2c is an inclined surface, it is possible to widen the spacing between the opposing side surfaces of the adjacent bandpass filters 2 toward the first surface 2a side.

Moreover, the second portion 2d of the side surface of the bandpass filter 2 is perpendicular to the fixed surface 1a of the block 1. The second portions 2d of the adjacent bandpass filters 2 are in contact with each other. By pressing and holding the bandpass filters 2 to each other, the bandpass filters 2 can be positioned with respect to the block 1.

Second Embodiment

Figure 8:
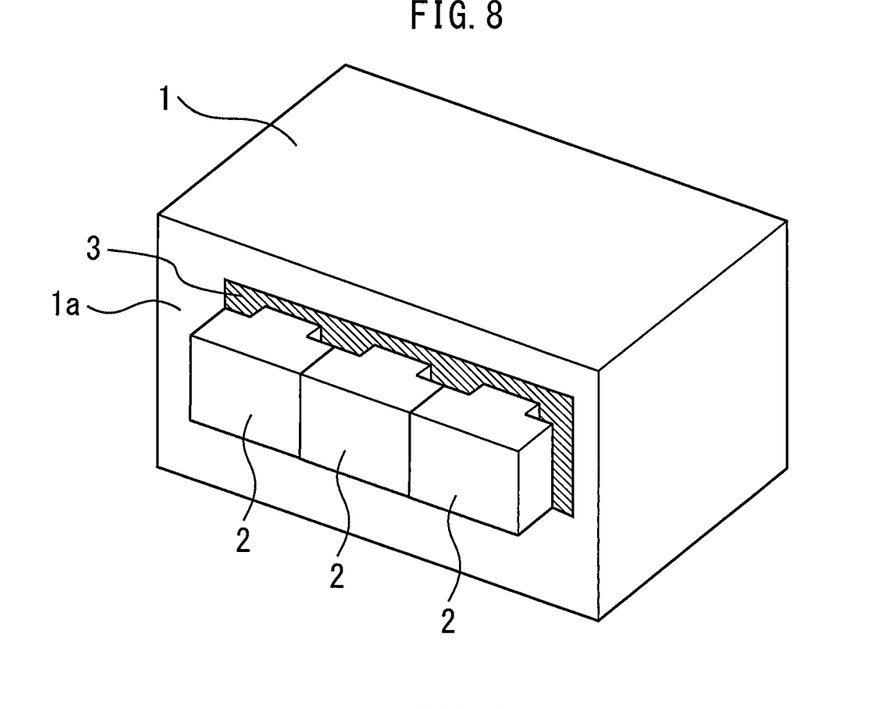
FIG. 8 is a perspective view illustrating an optical multiplexer/demultiplexer according to a second embodiment.
Figure 9:
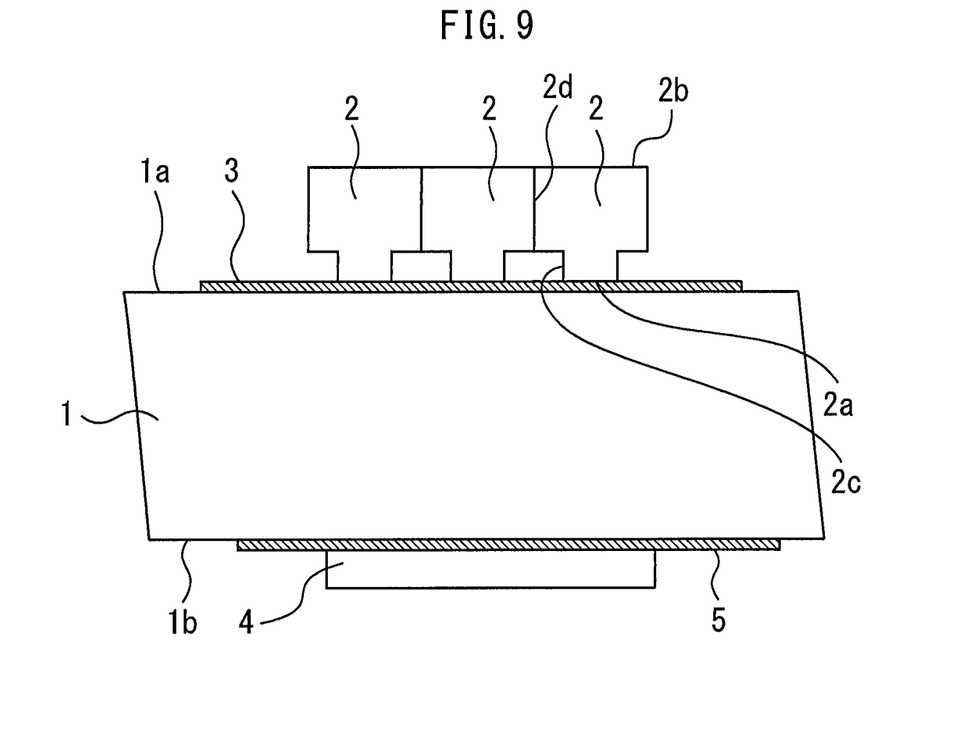
FIG. 9 is a cross-sectional view illustrating the optical multiplexer/demultiplexer according to the second embodiment.

FIG. 8 is a perspective view illustrating an optical multiplexer/demultiplexer according to a second embodiment. FIG. 9 is a cross-sectional view illustrating the optical multiplexer/demultiplexer according to the second embodiment. The first and second portions 2c and 2d of the side surfaces of the bandpass filters 2 are perpendicular to the fixed surface 1a of the block 1. That is, the bandpass filters 2 have convex cross-sectional shapes. The rest of the configuration is similar to the configuration of the first embodiment. The spacing between opposing side surfaces of the adjacent bandpass filters 2 can be further widened on the first surface 2a side, and it is thereby possible to more reliably prevent the adhesive 3 from creeping up between the bandpass filters 2 than in the first embodiment.

Third Embodiment

Figure 10:
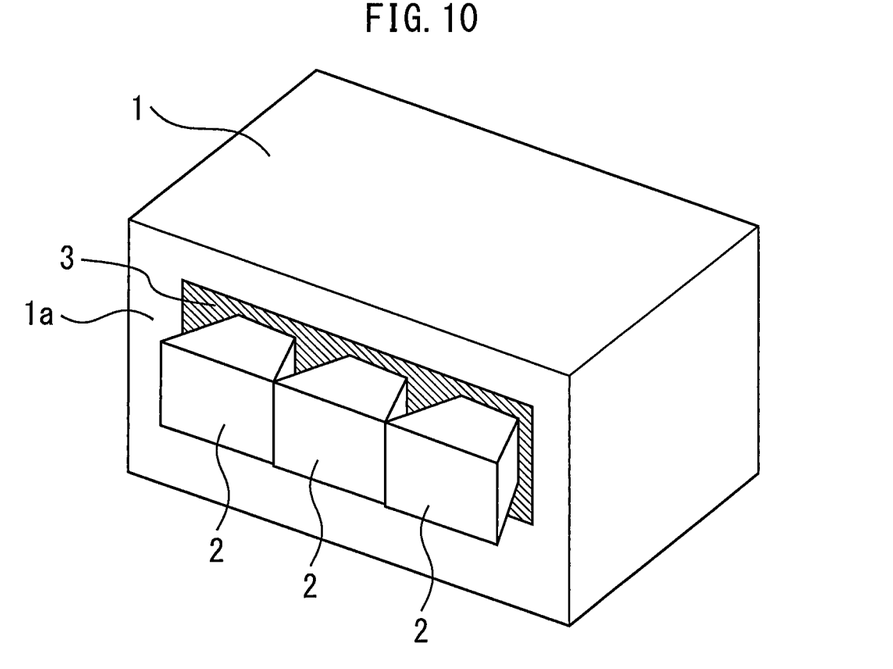
FIG. 10 is a perspective view illustrating an optical multiplexer/demultiplexer according to a third embodiment.
Figure 11:
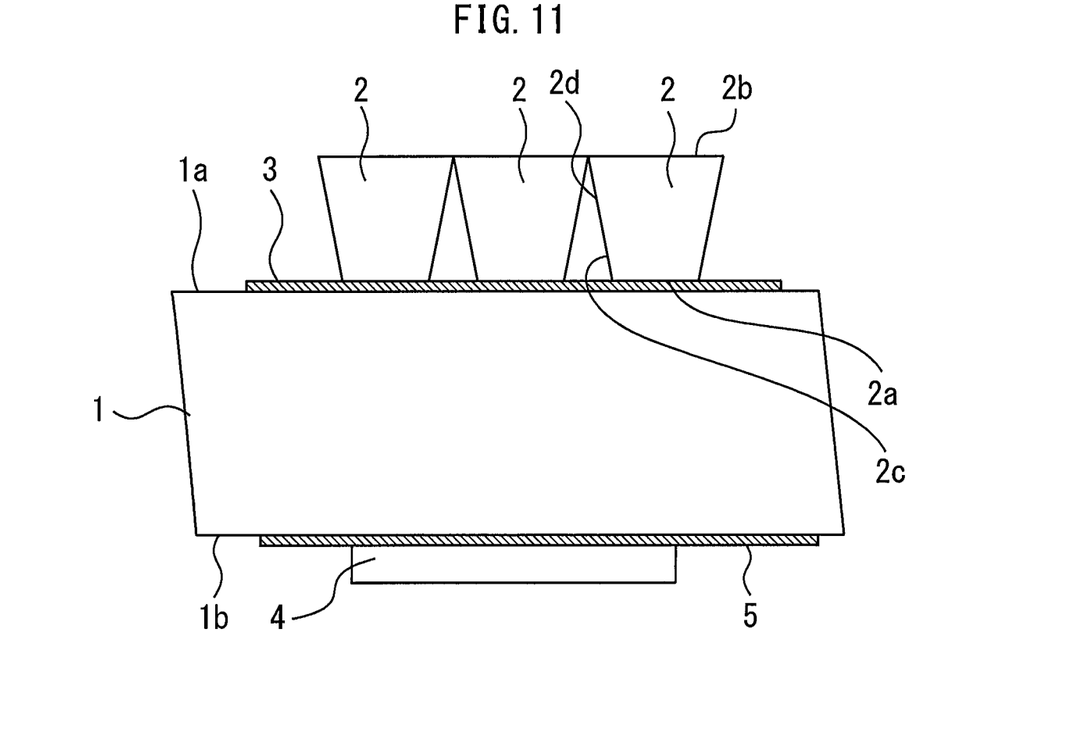
FIG. 11 is a cross-sectional view illustrating the optical multiplexer/demultiplexer according to the third embodiment.

FIG. 10 is a perspective view illustrating an optical multiplexer/demultiplexer according to a third embodiment. FIG. 11 is a cross-sectional view illustrating the optical multiplexer/demultiplexer according to the third embodiment. The bandpass filters 2 have trapezoidal cross-sectional shapes. The rest of the configuration is similar to the configuration of the first embodiment. This makes it possible to more reliably prevent the adhesive 3 from creeping up between the bandpass filters 2 than in the first embodiment.

Fourth Embodiment

Figure 12:
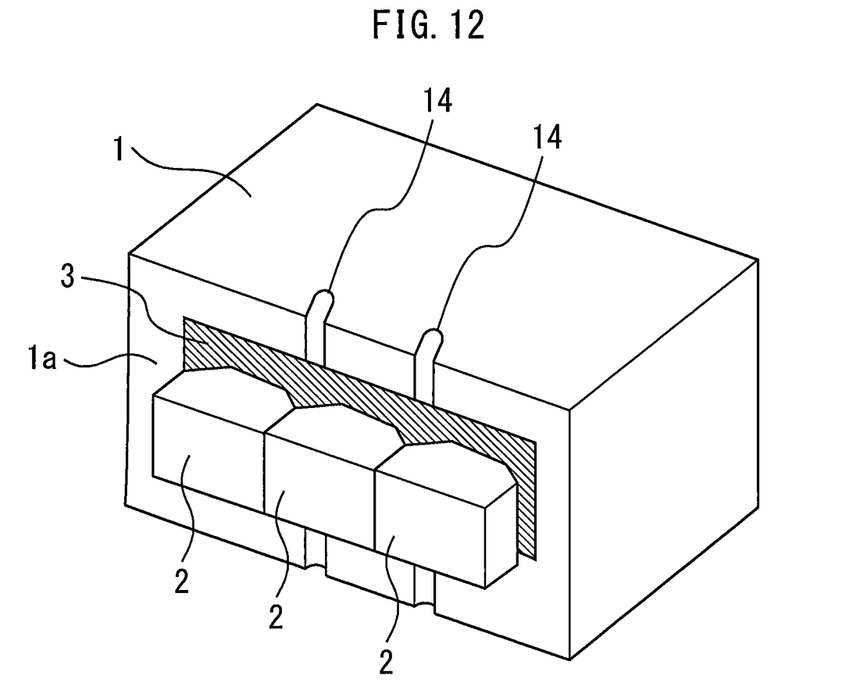
FIG. 12 is a perspective view illustrating an optical multiplexer/demultiplexer according to a fourth embodiment.
Figure 13:
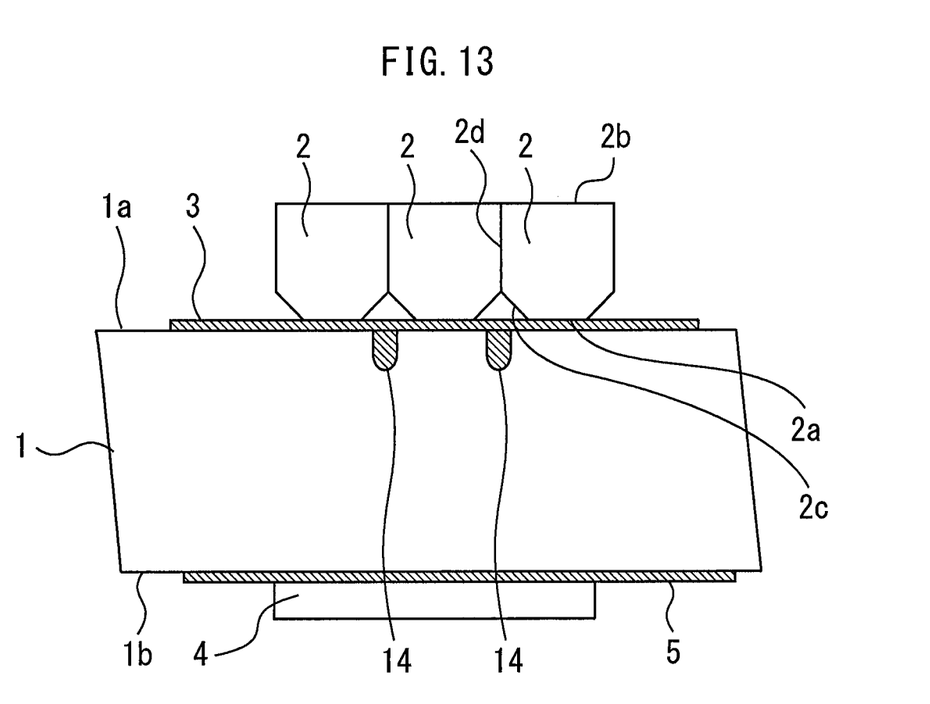
FIG. 13 is a cross-sectional view illustrating the optical multiplexer/demultiplexer according to the fourth embodiment.

FIG. 12 is a perspective view illustrating an optical multiplexer/demultiplexer according to a fourth embodiment. FIG. 13 is a cross-sectional view illustrating the optical multiplexer/demultiplexer according to the fourth embodiment. Grooves 14 are provided on the fixed surface 1a of the block 1 between joints of the fixed surface 1a with the first surfaces 2a of the plurality of band-pass filters 2. The spacing between the grooves 14 is the same as the width of the second surface 2b of the bandpass filter 2. The width of each groove 14 is smaller than the spacing between the first surfaces 2a of the adjacent bandpass filters 2. The rest of the configuration is similar to the configuration of the first embodiment. The grooves 14 provide spaces for the adhesive 3 to escape, making it possible to more reliably prevent the adhesive 3 from creeping up than in the first embodiment. This is particularly effective when the adhesive 3 with large viscosity and high fluidity is used. Note that the bandpass filters 2 may have the configuration of the second or third embodiment.

REFERENCE SIGNS LIST 1 block; 1a fixed surface; 2 bandpass filter; 2a first surface; 2b second surface; 2c first portion; 2d second portion; 3 adhesive; 6 coating film; 8,10 first jig; 9,11 second jig; 14 groove

The invention claimed is:

1. An optical multiplexer/demultiplexer comprising:
a glass block; and
a plurality of bandpass filters arranged side by side in a row on a fixed surface of the block and fixed using an adhesive,
wherein each bandpass filter includes a coating film for transmitting or reflecting light depending on a wavelength,
each bandpass filter includes a first surface fixed to the fixed surface, and a second surface opposite to the first surface and having a width larger than that of the first surface,
opposing side surfaces of the adjacent bandpass filters include a first portion on the first surface side and a second portion on the second surface side,
a spacing between the first portions of the adjacent bandpass filters is wider than a spacing between the second portions of the adjacent bandpass filters,
the second portion is perpendicular to the fixed surface,
the second portions of the adjacent bandpass filters are in contact with each other, and
grooves are provided on the fixed surface of the block between joints of the fixed surface with the first surfaces of the plurality of band-pass filters.

2. An optical multiplexer/demultiplexer comprising:
a glass block; and
a plurality of bandpass filters arranged side by side in a row on a fixed surface of the block and fixed using an adhesive,
wherein each bandpass filter includes a coating film for transmitting or reflecting light depending on a wavelength,
each bandpass filter includes a first surface fixed to the fixed surface, and a second surface opposite to the first surface and having a width larger than that of the first surface,
opposing side surfaces of the adjacent bandpass filters include a first portion on the first surface side and a second portion on the second surface side,
a spacing between the first portions of the adjacent bandpass filters is wider than a spacing between the second portions of the adjacent bandpass filters,
the second portion is perpendicular to the fixed surface,
the second portions of the adjacent bandpass filters are in contact with each other, and
the bandpass filters have polygonal shapes in a cross-sectional view along an optical axis.

3. The optical multiplexer/demultiplexer according to claim 2, wherein the first portion is an inclined surface.

4. The optical multiplexer/demultiplexer according to claim 3, wherein grooves are provided on the fixed surface of the block between joints of the fixed surface with the first surfaces of the plurality of band-pass filters.

5. The optical multiplexer/demultiplexer according to claim 2, wherein the bandpass filters have convex cross-sectional shapes.

6. The optical multiplexer/demultiplexer according to claim 5, wherein grooves are provided on the fixed surface of the block between joints of the fixed surface with the first surfaces of the plurality of band-pass filters.

7. A method for manufacturing the optical multiplexer/demultiplexer according to claim 2, comprising:
arranging the plurality of bandpass filters side by side in a row, pressing and holding the bandpass filters to a first jig such that the second portions of the adjacent bandpass filters come into contact with each other;
holding the block, in which the adhesive is applied to the fixed surface, to a second jig; and
combining the first jig and the second jig and curing the adhesive with the first surfaces of the plurality of bandpass filters in contact with the adhesive applied to the block.

8. A method for manufacturing the optical multiplexer/demultiplexer according to claim 2, comprising:
arranging the plurality of bandpass filters side by side in a row, placing the bandpass filters on the block, and pressing the bandpass filters to a first jig such that the second portions of the adjacent bandpass filters come into contact with each other; and
applying the adhesive to a gap between the fixed surface of the block and the first surfaces of the plurality of bandpass filters with the plurality of bandpass filters pressed against the block using a second jig and curing the adhesive.

9. The optical multiplexer/demultiplexer according to claim 2, wherein grooves are provided on the fixed surface of the block between joints of the fixed surface with the first surfaces of the plurality of band-pass filters.

10. An optical multiplexer/demultiplexer comprising:
a glass block; and
a plurality of bandpass filters arranged side by side in a row on a fixed surface of the block and fixed using an adhesive,
wherein each bandpass filter includes a coating film for transmitting or reflecting light depending on a wavelength,
each bandpass filter includes a first surface fixed to the fixed surface, and a second surface opposite to the first surface and having a width larger than that of the first surface,
opposing side surfaces of the adjacent bandpass filters include a first portion on the first surface side and a second portion on the second surface side,
a spacing between the first portions of the adjacent bandpass filters is wider than a spacing between the second portions of the adjacent bandpass filters, and
the bandpass filters have trapezoidal cross-sectional shapes.

11. The optical multiplexer/demultiplexer according to claim 10, wherein grooves are provided on the fixed surface of the block between joints of the fixed surface with the first surfaces of the plurality of band-pass filters.

* * * * *